A. F. DOEBERT.
Meat Chopper.
No. 67,854. Patented Aug. 20, 1867.
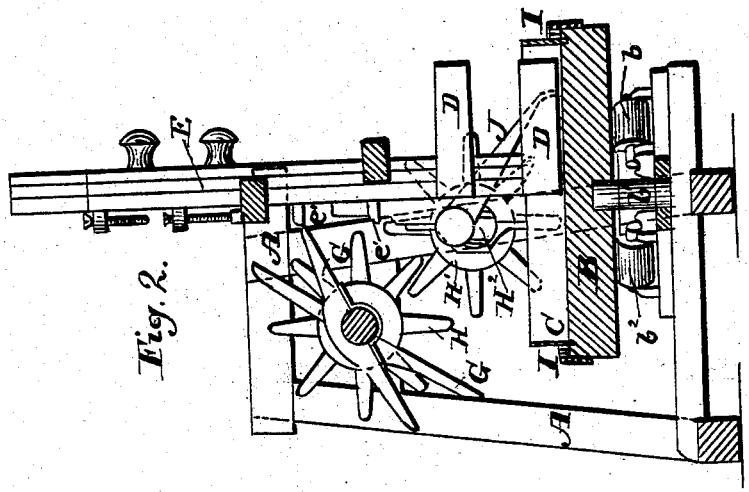
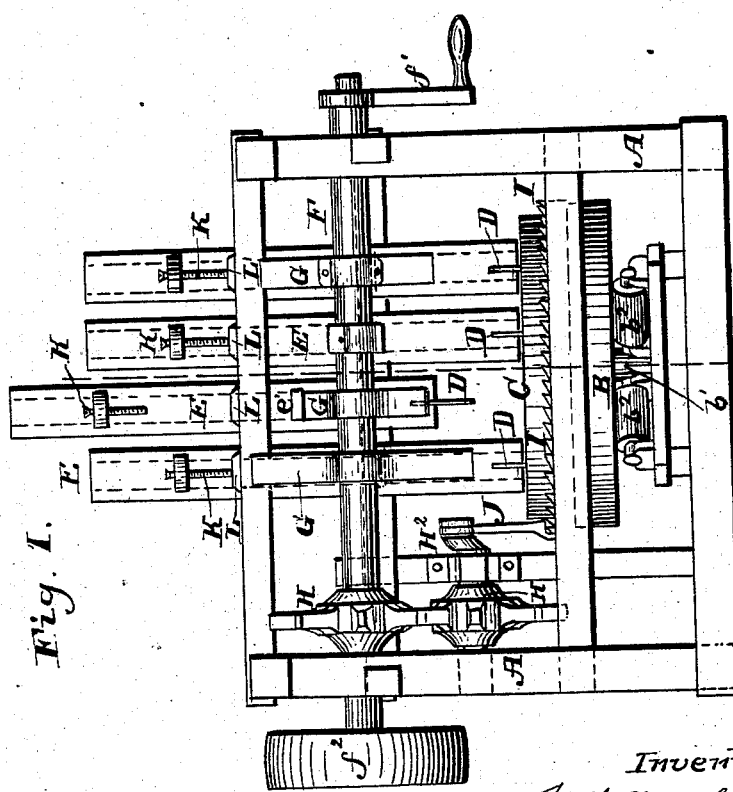

United States Patent Office.

AUGUSTUS F. DOEBERT, OF LANCASTER, NEW YORK.

Letters Patent No. 67,854, dated August 20, 1867.

IMPROVED MEAT-CHOPPER.

*The Schedule referred to in these Letters Patent and making part of the same.*

TO ALL WHOM IT MAY CONCERN:

Be it known that I, AUGUSTUS F. DOEBERT, of Lancaster, in the county of Erie, and State of New York, have invented a certain new and improved Meat-Chopper; and I do hereby declare that the following is a full and exact description thereof, reference being had to the accompanying drawings, making a part of this specification, in which—

Figure I is an elevation, and

Figure II is a transverse section.

The nature of this invention consists, first, in the combination and arrangement of set-screws upon the vertical timbers which carry the knives, with rubber or other springs secured to the frame of the machine by means of which the distance of the fall or drop of the knives may be regulated and its concussion upon the frame diminished; second, in the combination and arrangement of a revolving block with a meat-chopping machine, the said block being revolved by means of a ratchet-wheel secured to the periphery or outer edge thereof, and a pawl or dog hinged to a crank, and operated by appropriate gearing in such manner that the block will, from time to time, be moved a short distance around its centre, for the purpose of presenting another uncut portion of the meat upon the block to the action of the knives.

Letters of like name and kind refer to like parts in each of the figures.

A represents the main frame of the machine, upon which all the operating parts are supported. B represents the revolving block, which is supported upon the centre-pin $b^1$, and a number of friction-rollers, $b^2$. A circular rim, C, projects above the top of the block, which serves to retain the meat while the machine is in operation. D D represent the knives; they are securely fastened to the lower ends of the upright timbers E, which are movable within vertical guides formed upon the frame A. The knives D and timbers E are so arranged that they occupy only about one half of the surface of the block, leaving the other half open and unobstructed to permit access to the meat upon the block while the same is being chopped. F represents the main driving-shaft, which may be revolved either by hand, animal, or steam-power, having a winch, $f^1$, upon one end, and a pulley or chain-wheel, $f^2$, upon the other. G G represent lifting-arms, which are placed upon and fastened to the shaft in such manner as to reach in their revolution over to the timbers E, and by catching under the lugs $e'$, lift them up a short distance, and then drop them, their own weight being sufficient to cut into or chop the meat in the proper manner. H represents a spur-wheel upon the shaft F, which gears with another spur-wheel, $H^1$, upon a counter-shaft. This counter-shaft carries upon one end an overhung crank, $H^2$, which is located directly over the edge of the circular block B. I represents a ratchet-wheel attached to the block, and J a pawl or dog, which is hinged to the crank I, and rests upon said ratchet-wheel.

Now, as the crank is revolved by means of the gearing above described, the pawl will engage with the ratchet-teeth, and from time to time push or move the block a slight distance around its centre, thereby changing the position of the meat below at every revolution of the shaft and every drop of the knives.

K K represent set-screws made adjustable upon the timbers E E, and L L are pieces of rubber secured to the top of the frame A, both being so arranged that by means of the set-screws the distance of the fall of the knives and timbers E may be regulated, and by means of the rubber cushions or springs the concussion of the fall in some degree diminished.

What I claim as my invention, and desire to secure by Letters Patent, is—

1. The combination and arrangement of the set-screws K K and rubber cushions L L, with the timbers E E, carrying the knives D D, for the purpose and substantially as set forth.

2. The revolving chopping-block B, having an intermittent revolving movement, and a ratchet-wheel, I, connected therewith, in combination with the pawl J and crank $H^2$, for the purpose and substantially as herein described.

A. F. DOEBERT.

Witnesses:
B. H. MUEHLE,
HENRY KLERKE.